(12) United States Patent
Schaug-Pettersen et al.

(10) Patent No.: US 7,919,965 B2
(45) Date of Patent: Apr. 5, 2011

(54) SOURCE ARRANGEMENT AND METHOD FOR GENERATING ELECTROMAGNETIC WAVEFIELDS

(75) Inventors: Tor Schaug-Pettersen, Trondheim (NO); Svein Ellingsrud, Trondheim (NO); Terje Eidesmo, Ranheim (NO); Jan-Aage Langeland, Garnes (NO)

(73) Assignee: Electromagnetic Geoservices AS, Trondheim (NO)

( * ) Notice: Subject to any disclaimer, the term of this patent is extended or adjusted under 35 U.S.C. 154(b) by 741 days.

(21) Appl. No.: 11/792,005

(22) PCT Filed: Dec. 2, 2005

(86) PCT No.: PCT/GB2005/004626
§ 371 (c)(1),
(2), (4) Date: Nov. 29, 2007

(87) PCT Pub. No.: WO2006/059122
PCT Pub. Date: Jun. 8, 2006

(65) Prior Publication Data
US 2008/0122444 A1    May 29, 2008

(30) Foreign Application Priority Data
Dec. 2, 2004    (GB) .................................. 0426505.4

(51) Int. Cl.
*G01V 3/15*    (2006.01)
*G01V 3/12*    (2006.01)
(52) U.S. Cl. ...................................................... 324/365
(58) Field of Classification Search .................. 324/365
See application file for complete search history.

(56) References Cited

U.S. PATENT DOCUMENTS

| 1,818,331 | A |   | 8/1931  | Jakosky |
|-----------|---|---|---------|---------|
| 2,077,707 | A |   | 4/1937  | Melton |
| 2,139,460 | A |   | 12/1938 | Potapenko |
| 2,268,106 | A |   | 12/1941 | Blau |
| 2,426,918 | A |   | 9/1947  | Barret |
| 2,531,088 | A |   | 11/1950 | Thompson |
| 2,919,397 | A |   | 12/1959 | Morley |
| 2,953,742 | A |   | 9/1960  | Herbold |
| 3,052,836 | A |   | 9/1962  | Postma |
| 3,114,875 | A |   | 12/1963 | Haagensen |
| 3,182,250 | A | * | 5/1965  | Mayes .......................... 324/365 |
| 3,398,356 | A |   | 8/1968  | Still |
| 3,548,299 | A |   | 12/1970 | Duroux et al. |
| 3,763,419 | A |   | 10/1973 | Barringer |
| 3,806,795 | A |   | 4/1974  | Morey |
| 4,041,372 | A |   | 8/1977  | Miller et al. |
| 4,047,098 | A |   | 9/1977  | Duroux |
| 4,094,304 | A |   | 6/1978  | Wright, Jr. |
| 4,218,678 | A |   | 8/1980  | Fowler et al. |

(Continued)

FOREIGN PATENT DOCUMENTS

EP            1 256 019          6/2004

(Continued)

*Primary Examiner* — Jay M Patidar
(74) *Attorney, Agent, or Firm* — Patterson Thuente Christensen Pedersen, P.A.

(57) ABSTRACT

A source arrangement for generating electrogmagnetic (EM) wavefields, comprising an EM signal generator, at least three electrodes (141-144) connected to the generator, and a control system. The electrodes are spaced apart but not all in line. The control system is arranged to apply non-coincident time-varying signals or transmissions from the generator between different pairs of the electrodes. The non-coincidence can be by applying the signals sequentially or by applying the signals out of phase.

28 Claims, 3 Drawing Sheets

U.S. PATENT DOCUMENTS

| | | | |
|---|---|---|---|
| 4,229,809 A | 10/1980 | Schwalbe | |
| 4,245,191 A | 1/1981 | Schroeder | |
| 4,296,379 A | 10/1981 | Yoshizumi | |
| 4,298,840 A | 11/1981 | Bischoff et al. | |
| 4,308,499 A | 12/1981 | Thierbach et al. | |
| 4,417,210 A | 11/1983 | Rocroi et al. | |
| 4,446,434 A | 5/1984 | Sternberg et al. | |
| 4,516,226 A | 5/1985 | Peynaud et al. | |
| 4,616,184 A | 10/1986 | Lee et al. | |
| 4,617,518 A | 10/1986 | Srnka | |
| 4,633,182 A | 12/1986 | Dzwinel et al. | |
| 4,957,172 A | 9/1990 | Patton et al. | |
| 5,032,794 A | 7/1991 | Ridd et al. | |
| 5,770,945 A | 6/1998 | Constable | |
| 6,236,211 B1 | 5/2001 | Wynn | |
| 6,236,212 B1 | 5/2001 | Wynn | |
| 6,628,119 B1 | 9/2003 | Eidesmo et al. | |
| 6,696,839 B2 | 2/2004 | Ellingsrud et al. | |
| 6,717,411 B2 | 4/2004 | Ellingsrud et al. | |
| 6,842,006 B2 | 1/2005 | Conti et al. | |
| 6,859,038 B2 | 2/2005 | Ellingsrud et al. | |
| 6,864,684 B2 | 3/2005 | Ellingsrud et al. | |
| 6,950,790 B1 | 9/2005 | Nichols | |
| 7,026,819 B2 | 4/2006 | Eidesmo et al. | |
| 7,123,543 B2 | 10/2006 | Vaage et al. | |
| 7,126,338 B2 | 10/2006 | MacGregor et al. | |
| 7,145,341 B2 | 12/2006 | Ellingsrud et al. | |
| 7,149,672 B2 | 12/2006 | Torkildsen | |
| 7,202,669 B2 | 4/2007 | Ellingsrud et al. | |
| 7,319,330 B2 | 1/2008 | Amundsen | |
| 7,423,432 B2 | 9/2008 | Amundsen | |
| 7,471,089 B2* | 12/2008 | Zerilli et al. | 324/365 |
| 7,613,570 B2 | 11/2009 | Rosten et al. | |
| 7,664,603 B2 | 2/2010 | Rosten | |
| 2003/0048105 A1 | 3/2003 | Ellingsrud et al. | |
| 2003/0050759 A1 | 3/2003 | Srnka et al. | |
| 2003/0052685 A1 | 3/2003 | Ellingsrud et al. | |
| 2004/0000912 A1* | 1/2004 | Conti et al. | 324/350 |
| 2004/0027130 A1* | 2/2004 | Ellingsrud et al. | 324/334 |
| 2004/0090234 A1 | 5/2004 | Macune | |
| 2004/0176910 A1 | 9/2004 | Ellingsrud et al. | |
| 2005/0264294 A1 | 12/2005 | Constable | |
| 2006/0103387 A1 | 5/2006 | Amundsen | |
| 2006/0202697 A1 | 9/2006 | Sodal | |
| 2007/0150201 A1 | 6/2007 | Eidesmo et al. | |
| 2007/0294036 A1* | 12/2007 | Strack et al. | 702/14 |
| 2008/0065330 A1 | 3/2008 | Rosten et al. | |
| 2008/0169817 A1* | 7/2008 | Morrison et al. | 324/365 |
| 2008/0195358 A1 | 8/2008 | El Ouair et al. | |
| 2008/0221795 A1 | 9/2008 | Amundsen et al. | |
| 2009/0265111 A1* | 10/2009 | Helwig et al. | 702/7 |
| 2010/0045295 A1 | 2/2010 | Mittet et al. | |
| 2010/0052688 A1 | 3/2010 | Schaug-Pettersen | |
| 2010/0057363 A1 | 3/2010 | Amundsen | |
| 2010/0061187 A1 | 3/2010 | Sodal | |

FOREIGN PATENT DOCUMENTS

| | | |
|---|---|---|
| GB | 2 155 182 | 9/1985 |
| GB | 2 220 071 | 12/1989 |
| GB | 2390904 | 1/2004 |
| GB | 2391946 | 2/2004 |
| GB | 2395563 | 5/2004 |
| GB | 2404444 | 2/2005 |
| GB | 2411006 | 8/2005 |
| GB | 2413187 | 10/2005 |
| GB | 2413188 | 10/2005 |
| GB | 2415511 | 12/2005 |
| GB | 2421800 | 7/2006 |
| GB | 2425182 | 10/2006 |
| WO | WO 02/14906 | 2/2002 |
| WO | WO 2004/053528 | 6/2004 |
| WO | 2004/083898 | 9/2004 |

\* cited by examiner

SOURCE ARRANGEMENT AND METHOD FOR GENERATING ELECTROMAGNETIC WAVEFIELDS

RELATED APPLICATIONS

This application claims priority to PCT Application No. PCT/GB2005/004626 filed Dec. 2, 2005, and Great Britain Application No. 0426505.4 filed Dec. 2, 2004, the disclosures of which are hereby incorporated by reference in their entirety.

TECHNICAL FIELD

The present invention relates to a source for electromagnetic (EM) surveying, in particular for seabed logging.

BACKGROUND ART

Currently, the most widely used techniques for geological surveying, particularly in sub-marine situations, are seismic methods. These seismic techniques are capable of revealing the structure of the subterranean strata with some accuracy. However, whereas a seismic survey can reveal the location and shape of a potential reservoir, it can normally not reveal the nature of the reservoir.

It has been appreciated by the present applicants that while the seismic properties of hydrocarbon filled strata and water-filled strata do not differ significantly, their electromagnetic resistivities do differ. Thus, by using an electromagnetic surveying method, these differences can be exploited and the success rate in predicting the nature of a reservoir can be increased significantly.

Consequently, a method and an apparatus embodying these principles together form the basis of the present applicants' EP-A-1256019.

This contemplates a method for searching for a hydrocarbon containing subterranean reservoir which comprises: applying a time varying electromagnetic field to subterranean strata; detecting the electromagnetic wave field response; seeking, in the wave field response, a component representing a refracted wave; and determining the presence and/or nature of any reservoir identified based on the presence or absence of a wave component refracted by hydrocarbon layer.

A refracted wave behaves differently, depending on the nature of the stratum in which it is propagated. In particular, the propagation losses in hydrocarbon stratum are much lower than in a water-bearing stratum while the speed of propagation is much higher. Thus, when an oil-bearing reservoir is present, and an EM field is applied, a strong and rapidly propagated refracted wave can be detected. This may therefore indicate the presence of the reservoir or its nature if its presence is already known.

Electromagnetic surveying techniques in themselves are known. However, they are not widely used in practice. In general, the reservoirs of interest are about 1 km or more below the seabed. In order to carry out electromagnetic surveying as a stand alone technique in these conditions, with any reasonable degree of resolution, short wavelengths are necessary. Unfortunately, such short wavelengths suffer from very high attenuation. Long wavelengths do not provide adequate resolution. For these reasons, seismic techniques are preferred.

However, while longer wavelengths applied by electromagnetic techniques cannot provide sufficient information to provide an accurate indication of the boundaries of the various strata, if the geological structure is already known, they can be used to determine the nature of a particular identified formation, if the possibilities for the nature of that formation have significantly differing electromagnetic characteristics. The resolution is not particularly important and so longer wavelengths which do not suffer from excessive attenuation can be employed.

The resistivity of seawater is about 0.3 ohm-m and that of the overburden beneath the seabed would typically be from 0.3 to 4 ohm-m, for example about 2 ohm-m. However, the resistivity of an oil reservoir is likely to be about 20-300 ohm-m. This large difference can be exploited using the techniques of the present invention.

Typically, the resistivity of a hydrocarbon-bearing formation will be 20 to 300 times greater than water-bearing formation.

Due to the different electromagnetic properties of a gas/oil bearing formation and a water bearing formation, one can expect a reflection and refraction of the transmitted field at the boundary of a gas/oil bearing formation. However, the similarity between the properties of the overburden and a reservoir containing water means that no reflection or refraction is likely to occur.

Thus, EM source such as an electric dipole transmitter antenna on or close to the sea floor induces (EM) fields and currents in the sea water and in the subsurface strata. In the sea water, the EM-fields are strongly attenuated due to the high conductivity in the saline environment, whereas the subsurface strata with less conductivity potentially can act as a guide for the EM-fields (less attenuation). If the frequency is low enough (in the order of 1 Hz), the EM-waves are able to penetrate deep into the subsurface, and deeply buried geological layers having higher electrical resistivity than the overburden (as e.g. a hydrocarbon filled reservoir) will affect the EM-waves. Depending on the angle of incidence and state of polarisation, an EM wave incident upon a high resistive layer may excite a ducted (guided) wave mode in the layer. The ducted mode is propagated laterally along the layer and leaks energy back to the overburden and receivers positioned on the sea floor. The term "refracted" wave in this specification is intended to refer to this wave mode.

Both theory and laboratory experiments show that the ducted mode is excited only for an incident wave with transverse magnetic (TM) polarisation (magnetic field perpendicular to the plane of incidence) and at angles of incidence close to the Brewster angle and the critical angle (the angle of total reflection). For transverse electric (TE) polarisation (electric field perpendicular to the plane of incidence) the ducted mode will not be excited. Since the induced current is proportional to the electric field, the current will be parallel to the layer interfaces for TE polarisation but, for TM polarisation, there is an appreciable current across the layer interfaces.

These phenomena form the basis of the present applicants' WO-A-02/14906 which contemplates a method of determining the nature of a subterranean reservoir which comprises: deploying an electric dipole transmitter antenna with its axis generally horizontal; deploying an electric dipole receiver antenna in an in-line orientation relative to the transmitter; applying an electromagnetic (EM) field to the strata containing the reservoir using the transmitter; detecting the EM wave field response using the receiver and identifying in the response a component representing a refracted wave from the reservoir according to a first mode; deploying an electric dipole receiver antenna in an orthogonal orientation relative to the transmitter; applying an EM field to the strata using the transmitter; detecting the EM wave field response using the receiver and identifying in the response a component representing a refracted wave from the reservoir according to a second mode; and comparing the first mode refractive wave response with the second mode refracted wave response in order to determine the nature of the reservoir.

A horizontal dipole source at the sea floor will generate both TE and TM waves, but the ratio of the amplitudes depends on the direction of propagation relative to the direction of the dipole. In the direction of the dipole, only the TM wave is emitted, whereas in a direction at right angles to the dipoles, only the TE wave is emitted. In between, a mixture of the two modes is emitted, the TM mode dominating for angles with the dipole up to 45° and the TE mode dominating for angles with the dipole from 45° to 90°. Thus, even if the receivers are capable of receiving both modes with equal sensitivity, comparison of the two modes will not be feasible for directions in a certain range around 0° or 90°. This difficulty may be remedied by using, instead of a single dipole source, a multiple dipole source, capable of emitting TE and TM modes of approximately equal amplitudes in all directions simultaneously. The TM mode is influenced by the presence of buried high resistive layers, whereas the TE mode is not. By measuring with the two antenna configurations and exploiting the difference between the two sets of measurements, it is possible to identify deeply buried high resistivity zones, i.e. a hydrocarbon reservoir.

WO-A-02/14906 also contemplates a method of searching for a hydrocarbon-containing subterranean reservoir which comprises: deploying an electric dipole transmitter antenna with its axis generally horizontal; deploying an electric dipole receiver antenna in an in-line orientation relative to the transmitter; applying an EM field to subterranean strata using the transmitter; detecting the EM wave field response using the receiver; seeking in the response a component representing a refracted wave according to a first mode, caused by a high-resistivity zone; deploying an electric dipole receiver antenna in an orthogonal orientation relative to the transmitter; applying an EM field to the strata using the transmitter; detecting the EM wave field response using the receiver; seeking in the response a component representing a refracted wave according to a second mode; and comparing the first mode refractive wave response with the second mode refractive wave response in order to determine the presence and/or nature of any high-resistivity zone.

The first mode may be considered to be a TM mode, and the second mode a TE mode. Thus, measurements are taken with the transmitter and receiver in both in-line and orthogonal orientations, and the two sets of measurements are compared. A characteristic difference in values indicates a highly resistive layer located beneath highly conductive strata. High resistivity indicates the presence of hydrocarbons and so the difference in values is a direct hydrocarbon indicator.

SUMMARY OF THE INVENTION

It is an object of the present invention to provide an improved EM source arrangement for applying an EM wave field to subsea strata.

According to the invention, there is provided a source arrangement for generating electromagnetic (EM) wavefields, comprising one or more EM signal generators, three or more electrodes connected to the generators, and a control system; the electrodes being spaced apart but not all in line; the control system being arranged to apply non-coincident time-varying signals from the generator(s) to different pairs of the electrodes. Thereby producing a rotating electric field having continuous in-line and orthogonal orientations.

The term "non-coincident signals" encompasses signals, which may be identical, applied sequentially to different pairs of electrodes, and also signals which are out of phase but which may be identical (translated in time), applied simultaneously to different pairs of electrodes. The term excludes simply applying identical signals simultaneously, if the signals are in phase.

Preferably the electrodes are in the same plane. The plane is preferably approximately generally horizontal. There are preferably three electrodes in a triangle, or four in a quadrilateral.

Thus, in one embodiment, the signals are applied sequentially to the different pairs of electrodes, thereby constituting non-coincident signals. The control system may be arranged to apply a signal between a first of three electrodes and a second of the three electrodes, and subsequently to apply a signal between the third electrode and one of the first and second electrode. Effectively, two electrodes between which the signal is applied together constitute a dipole.

A preferred sequence where the electrodes are numbered consecutively would be electrodes 1 and 2, followed by electrodes 2 and 3, followed by electrodes 3 and 1. Such a sequence constitutes a rotating electric field.

Alternatively, the control system is arranged to apply the signal between a first electrode of four electrodes and a second electrode, and subsequently to apply the signal between a third electrode and one of the other three electrodes.

A preferred sequence in this case, again with the electrodes numbered consecutively, would be electrodes 1 and 2, followed by electrodes 2 and 3, followed by electrodes 3 and 4, followed by electrodes 4 and 1. An alternative sequence would be electrodes 1 and 3, followed by electrodes 2 and 4. Both these sequences constitute a rotating electrical field.

In another embodiment, the signals are applied simultaneously or constantly to the different pairs of electrodes, but the signals are mutually out of phase, thereby constituting non-coincident signals. They may therefore be considered to be linearly independent, translated in time but not by a whole number of periods.

In one arrangement, there are two electrodes forming an angle of 90° with a third, signals are applied respectively between the first and third, and the second and third, and the two signals are 90° out of phase.

In another arrangement, there are four electrodes arranged as two pairs at 90° to each other, signals are applied respectively to the two pairs, and the signals are 90° out of phase.

In a further arrangement, there are three electrodes forming three pairs, signals are applied respectively to the three pairs, and the signals are 120° out of phase.

In a still further arrangement, there are four electrodes forming four sequential pairs, signals are applied respectively to the four pairs and the signals are 90° out of phase. In all cases, the out-of-phase signals constitute a rotating electrical field.

Conveniently, the EM signal generator is located on a marine vessel and the electrodes are towed behind the vessel by means of cables. In a preferred embodiment, the cables are connected to a central towfish, and the towfish is attached to the vessel by means of an umbilical. The cables may be towed and controlled so that the electrodes are located within about 50m of the seabed, preferably 15 to 30 m.

Preferably, the wavelength of the transmission is given by the formula $$0.01\,h \leq \lambda \leq 30\,h;$$

wherein $\lambda$ is the wavelength of the transmission through the overburden and h is the distance from the seabed to the strata under investigation, though this could change particularly with more powerful transmitters and more sensitive receivers.

Preferably, 0.1 h≦λ≦10 h. Preferably, the transmission frequency is from 0.01 Hz to 1 kHz, e.g. from 0.1 to 20 Hz, typically about 0.25 to 3 Hz.

The generated EM waveform may take different forms. Typical examples include square, triangular and sine waves. Specific frequencies and waveforms may be designed to suit particular surveys.

The cables are preferably deployed in such a way that the electrodes are spaced apart by a distance in the range 100 to 800 m, more preferably in the range 200-300m.

Preferably, the maximum current transmitted via the electrodes is at least 100 A and may be in the range 100 to 10,000 A, more preferably 1000 to 5000 A.

The invention also extends to a method of generating an EM wavefield using an arrangement as described, the method comprising: applying non-coincident time-varying EM signals to different pairs of electrodes.

The invention also extends to a method of conducting an EM survey which comprises generating an EM wavefield as described, detecting the EM response using an EM receiver (depicted as R in FIG. 1), and analyzing the EM response.

Preferably, the source is towed over an array of receivers at the sea bed while continuously emitting an EM wavefield similar to that emitted from a rotating dipole.

The invention also extends to using the analysis to produce a survey report.

BRIEF DESCRIPTION OF THE DRAWINGS

The invention may be carried into practice in various ways, and some embodiments will now be described by way of example with reference to the accompanying drawings, in which.

DETAILED DESCRIPTION OF THE DRAWINGS

The purpose of this invention is to provide an electromagnetic source that radiates a powerful EM signal in deep sea or shallow water exciting two modes simultaneously. The intention is to penetrate the underground with the signal. The signals received back from underground can give indications as to whether a reservoir is hydrocarbon filled or not.

Figure 1:
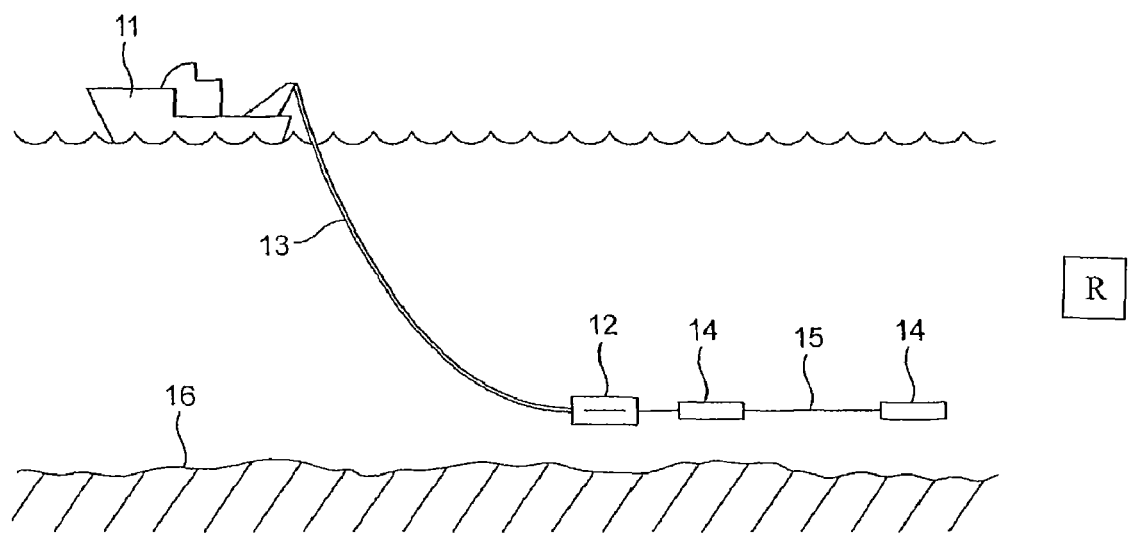
FIG. 1 is a schematic diagram of an EM source for marine applications, in accordance with the invention.

FIG. 1 shows the general arrangement of the equipment. A vessel 11 tows a towfish 12 by means of an umbilical connection 13 which acts as a towing cable and provides electrical and communications connections. A series of electrodes 14 are towed behind the towfish 12 by cables or streamers 15 (only one of which is shown) in the vicinity of the seabed 16.

A power supply (not shown) is located on the vessel 11 (topside).

The electromagnetic source has an output power of 100 kW or more if possible and the current between the electrodes is about 1,000 amperes, with controlled frequency, phase and amplitude.

The maximum depth for the subsea components is 4000 meters. The towfish 12 with the electrodes 14 and streamers 15 will be towed behind the vessel 11 with a speed of about 1 to 3 knots, though higher speeds might be possible.

The maximum distance between the electrodes 14 is up to about 250 m but could be up to 500 m.

The power from the source in the umbilical is 200-400 Hz, 3 phase 4.5 kV, and the subsea current source will consist of one or more transformers, and a semiconductor converter with an appropriate number of output terminals, depending on the number of electrodes. The transformer(s) will be located in an oil filled tank under full seawater pressure, and the converter will be either put into the same transformer tank, or placed in separate, pressure-proof canisters.

Effectively, modulated AC is produced on the vessel 11 by means of a frequency converter, converting 60 Hz fixed voltage to 300 Hz variable voltage. This is routed to the electrodes 14, which are selectable by means of respective individual bipolar thyristor rectifiers located subsea.

The thyristor rectifier is used as a diode rectifier that can be turned on and off. In this way, the thyristor rectifier determines the direction of the current, and the converter topside controls the current magnitude by controlling the voltage. This strategy can be used on a multi-electrode system; the topside converter will control the magnitude of the current, but the thyristor rectifier will also control which electrode is to be fed and the direction of current in it.

It is possible to connect more than one electrode to the same DC (LF) potential; the current sharing between electrodes is determined by the resistances in the LF circuit. The voltage has to be set to zero before a change of current to another electrode or change in current direction can take place. This strategy is known as DC-drive or cycloconverter control. The current to the electrodes is programmed as a function of time, the frequency spectrum of the transmitted signal is determined by this function.

The preferred umbilical has a torque balanced steel armouring or carbon fibre (CF) armouring if reduced weight and size are desired. CF may also be less influenced by strong magnetic fields than steel. The total weight of the umbilical at a length of 4500 m will be about 11 tons. The minimum drum diameter is about 1.2 m.

The complete system is synchronized to UTC (Coordinated Universal Time) time. To maintain synchronization to UTC time a TCP/IP communication with NTP or PTP protocol is recommended. The precision should be ≦0.1 msec. Control of the subsea equipment is performed through fiber optical multiplexers. To maintain synchronization to this subsea equipment a TCP/IP communication with NTP or PTP protocol is used.

Figure 2:
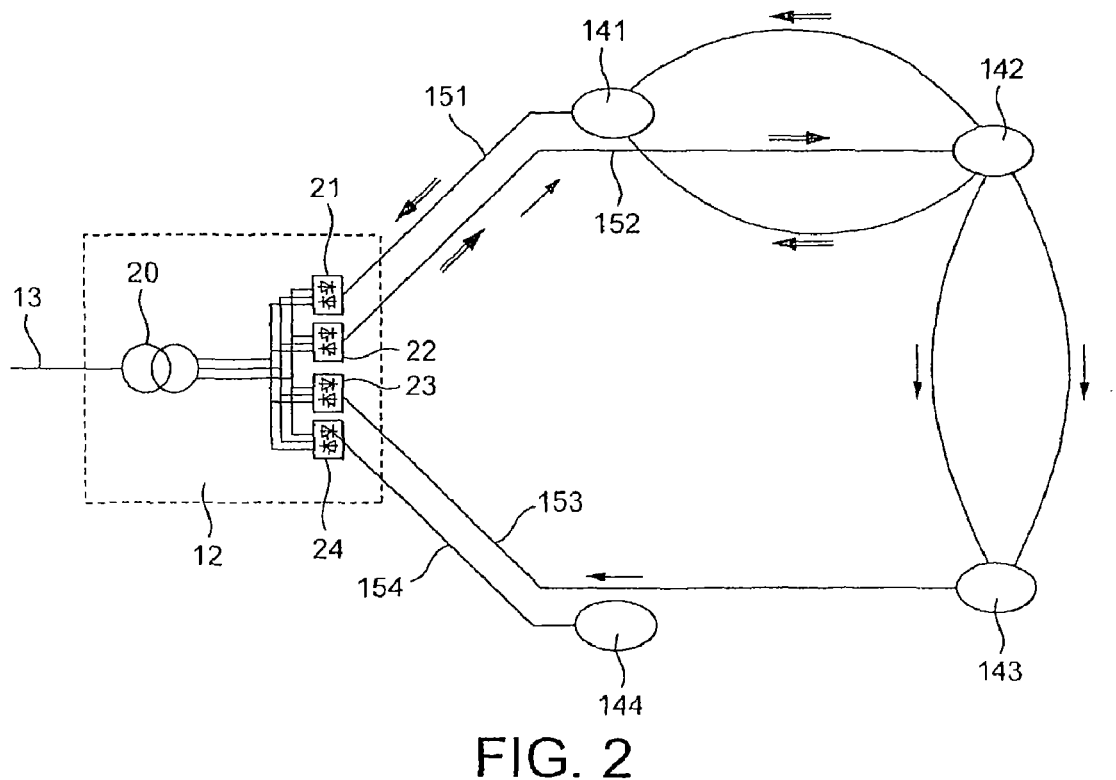
FIG. 2 shows one geometry for four electrodes.

FIG. 2 shows one possible arrangement of the system, in which four electrodes 141, 142, 143 and 144 are used. These are mounted on respective neutral buoyancy cables (streamers) 151, 152, 153 and 154 which are connected to the towfish 12, which is itself connected to the vessel (not shown) by the umbilical 13. The towfish 12 houses a transformer 20 and a thyristor converter 21, 22, 23, 24 for each electrode 141, 142, 143, 144. The towfish 12 and neutral buoyancy cables 151-154 are controlled during towing so that the electrodes 141-144 are arranged in a square, about 500 m apart.

The flow of current when electrode 142 is positive and 141 is negative is indicated with double arrows (case 1), and the flow of current when 142 is positive and 143 is negative is indicated with single arrows (case 2). Thus, the current path and the transmitted electric field will be different in the two cases.

In case 1, the DC current path is effectively, towfish 12 to electrode 141 to electrode 142, through the seawater to electrode 141 and back to the towfish 12. The currents towfish to electrode 141 and electrode 141 to towfish will cancel each other out and the current feed from 141 to 142 in the cable is in the centre of the return path in the seawater.

It should be noted that, in general, the radiation emitted when a current is fed to an electrode pair is not pure dipole radiation, but also contains a certain amount of magnetic dipole radiation, depending on the path of the return current.

The maximum distances between electrodes 141-142 and 141-144 is 500 m.

If the towing angle between central unit and electrodes 1 and 4 is about 30 degrees, then the cable length between the towfish 12 and electrode 141 (and the towfish and electrode 144) will be 500 m.

It should be noted that the cable capacity for this length has to be 2 times 20000 A. The whole system must have total cable length of 3000m of a cable capable of 20 000 A. (single conductor).

Figure 3:
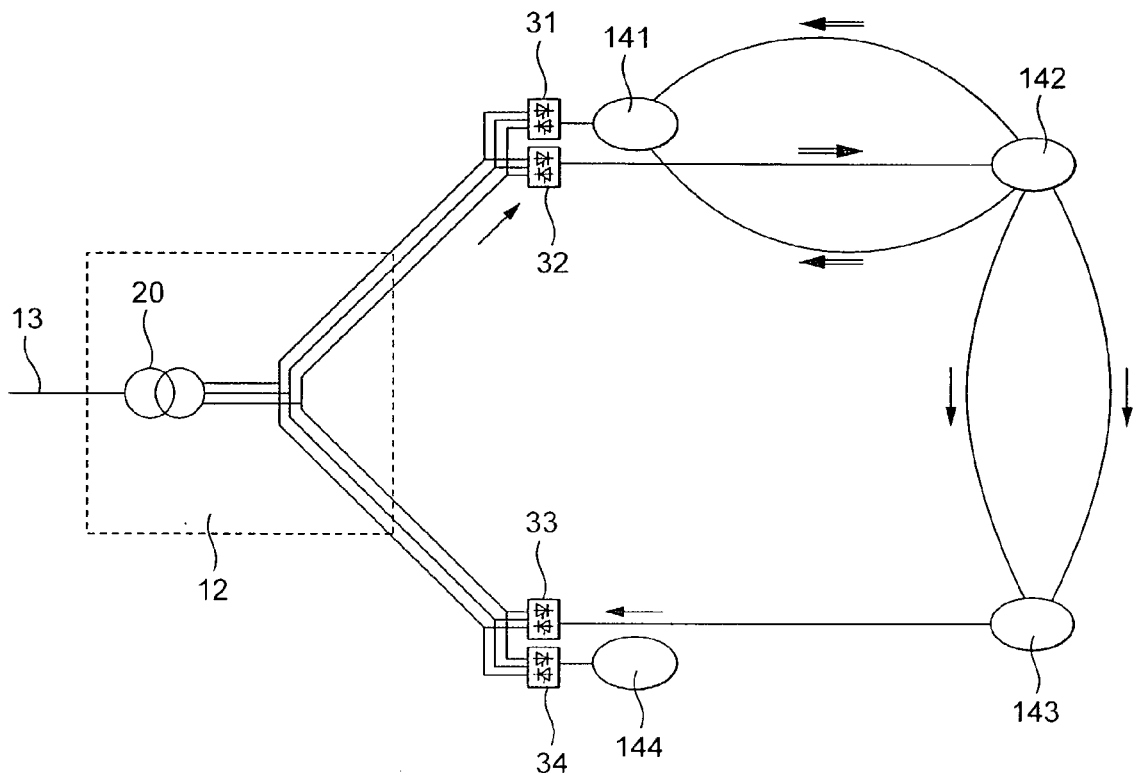
FIG. 3 shows a variation on the arrangement of FIG. 2.

Whereas in FIG. 2, the converters 21-24 were centrally located in the towfish, in FIG. 3, the transformer 20 remains centrally located in the towfish 12, the converters 31-34 are housed in two separate converter units 35, 36 located at the electrode 141 and 144 positions. Thus, in this configuration, low AC voltage is sent to each side of the system, to the double converters located at electrodes 141 and 144. In this case, in case 1 (double arrows), there will be full AC current in the path towfish to 141 and the maximum RMS value will be 20000 A×0.82=16400 A. Distributed on 3 wires, this will correspond to 50000 A total DC capacity, which is more than twice 20000 A.

The advantage of the FIG. 3 configuration is that 2 identical converter units can be used, while the disadvantage is that more copper is needed in the paths between the towfish and electrodes 141 and 144.

In both cases, a rotating field can be achieved by sequentially selecting as a dipole, electrodes as follows: 141/142, 142/143, 143/144, 144/141; or 141/143, 144/142, in the latter case, the pairs may be fed the same periodic signal with a relative time shift of one quarter period.

Figure 4:
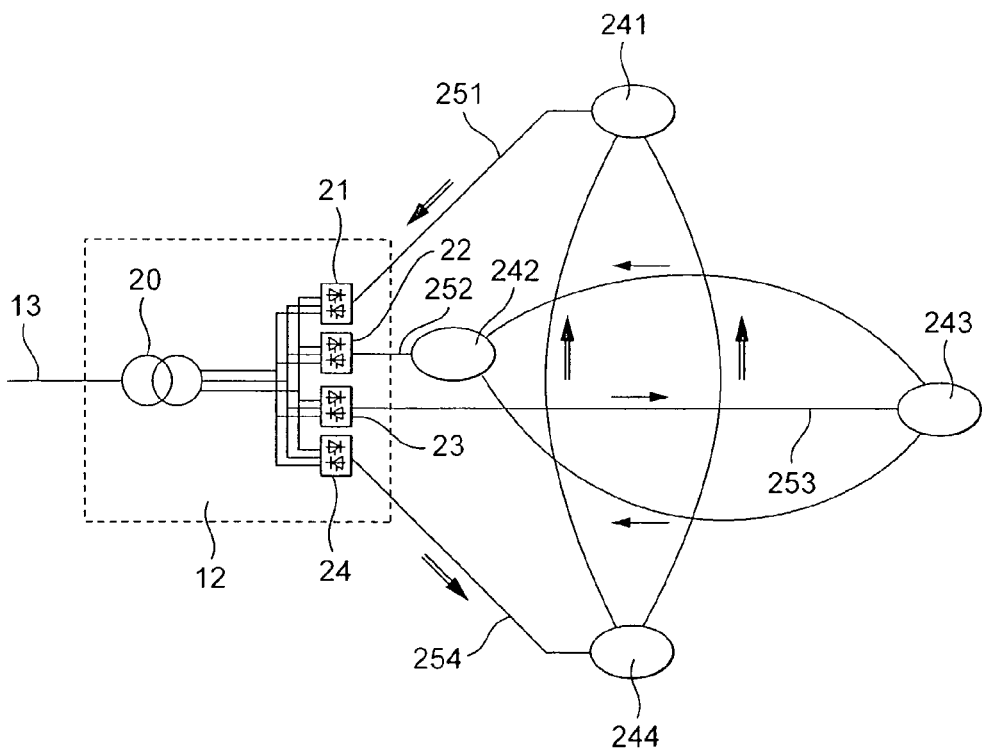
FIG. 4 shows an alternative geometry for four electrodes.

FIG. 4 shows an alternative configuration using four electrodes. The arrangement of the transformer 20 and converters 21-24 in the towfish 12 is the same as in the embodiment of FIG. 2, however, in this case the electrodes 241, 242, 243, 244 are arranged as a diamond on respective streamers 251, 252, 253, 254. Thus, electrodes 241 and 244 remain in the same position as electrodes 141 and 144 in the previous configurations, but electrodes 242 and 243 are at new positions. Electrode 242 is centrally located near to the towfish 12 while electrode 243 is centrally located remote from the towfish 12.

Assuming 250 m as maximum distance between active electrodes, this configuration will demand 600 m DC cable. Here too there will be an additional magnetic dipole radiation for an excitation between electrodes 244 and 241 (double arrows), and between electrodes 243 and 242 (single arrows), and between electrodes 243 and 242 (single arrows).

In this case, a rotating field can be achieved by sequentially selecting as a dipole, 244/241, 243/242 or, as above, feeding the two pairs the same periodic signal with a relative time shift of one quarter period.

Figure 5:
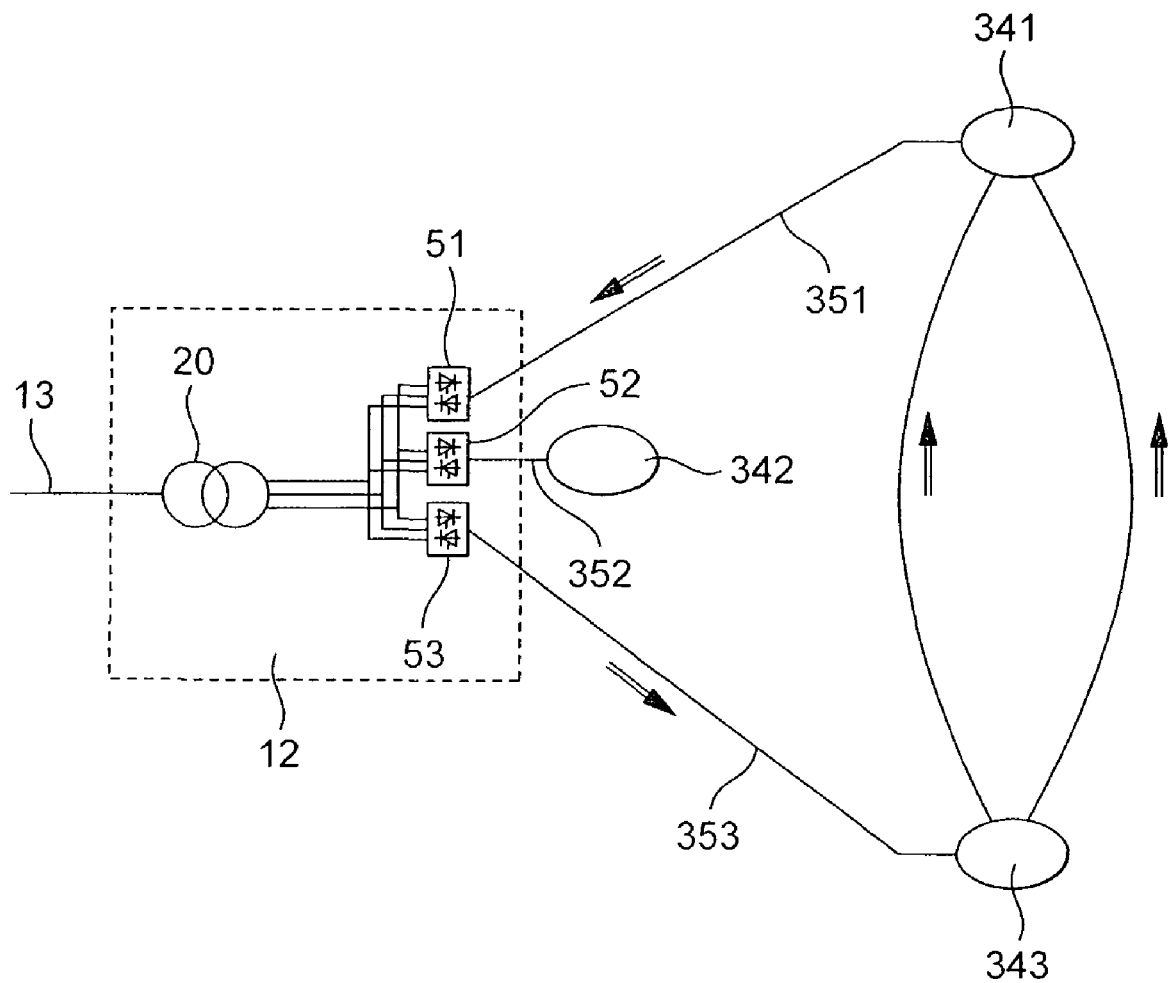
FIG. 5 shows one geometry for three electrodes.

FIG. 5 shows a configuration using only three electrodes 341, 342, 343, mounted on three respective streamers 351, 352, 353. The towfish 12 in this case houses the transformer 20, but only three converters 51, 52, 53, one for each electrode. The electrodes 341-343 are arranged in an isosceles triangle, with electrode 342 central and close to the towfish 12 and electrodes 341 and 343 distant from the towfish and located on either side. The angle at 342 may be 60° or 90°. There are several possible feed arrangements which will produce a rotating field.

When the angle is 60°, the pairs 341/342, 342/343, 343/341, may be fed in sequence, or, alternatively, these pairs may be fed the same periodic signal, shifted ⅓ period and ⅔ period respectively for the last 2 pairs. When the angle is 90°, the pairs 341/342 and 342/343 may be fed the same periodic signal, shifted ¼ period for the last pair.

A further 3-electrode configuration is possible, in which the central proximate electrode 342 is replaced by a distant central electrode. This can be achieved simply by extending the cable 352 in FIG. 5. Alternatively, two umbilicals can be used, each extending to separate converter unit. The two converter units would be separately connected to all three electrodes and each would handle half the power.

The generated source signals are in the frequency range of 0.001-100 Hz. The user can at startup define different output signals and store these. Control of the rotating electrical field, the sequence of active electrodes, will also be stored.

The invention claimed is:

1. A source arrangement for generating electrogmagnetic (EM) wavefields, comprising an EM signal generator, at least three electrodes connected to the generator, and a control system; the electrodes being spaced apart but not all in line and being attached to cables adapted to allow the electrodes to be towed behind a marine vessel with the EM signal generator located on the marine vessel; the control system being arranged to apply non-coincident signals from the generator to different pairs of the electrodes, thereby producing a rotating electric field.

2. An arrangement as claimed in claim 1, wherein the electrodes are in the same plane.

3. An arrangement as claimed in claim 1, wherein there are three electrodes arranged as a triangle.

4. An arrangement as claimed in claim 1, wherein there are four electrodes, arranged as a quadrilateral.

5. An arrangement as claimed in claim 1, wherein the signals are applied sequentially to the different pairs of electrodes, thereby constituting non-coincident signals.

6. An arrangement as claimed in claim 5, wherein the control system is arranged to apply a signal between a first of three electrodes and a second of the three electrodes, and subsequently to apply a signal between the third electrode and one of the first and second electrode.

7. An arrangement as claimed in claim 5, wherein the control system is arranged to apply the signal between a first electrode of four electrodes and a second electrode, and subsequently to apply the signal between a third electrode and one of the other three electrodes.

8. An arrangement as claimed in claim 1, wherein the signals are applied simultaneously to the different pairs of electrodes, the signals being mutually out of phase, thereby constituting non-coincident signals.

9. An arrangement as claimed in claim 8, wherein there are two electrodes forming an angle of 90° with a third, signals are applied respectively between the first and third, and the second and third, and the two signals are 90° out of phase.

10. An arrangement as claimed in claim 8, wherein there are four electrodes arranged as two pairs at 90° to each other, signals are applied respectively to the two pairs, and the signals are 90° out of phase.

11. An arrangement as claimed in claim 8, wherein there are three electrodes forming three pairs, signals are applied respectively to the three pairs, and the signals are 120° out of phase.

12. An arrangement as claimed in claim 8, wherein there are four electrodes forming four sequential pairs, signals are applied respectively to the four pairs and the signals are 90° out of phase.

13. An arrangement as claimed in claim 1, wherein the cables are connected to a central towfish, and the towfish is attached to the vessel by means of an umbilical.

14. An arrangement as claimed in claim 1, wherein the electrodes are located within 50 m of the seabed.

15. An arrangement as claimed in claim 1, wherein the frequency of the EM field is continuously varied over the transmission period.

16. An arrangement as claimed in claim 1, wherein the EM field is transmitted for a period of time for 3 seconds to 60 minutes.

17. An arrangement as claimed in claim 16, wherein the transmission time is from 10 seconds to 5 minutes.

18. An arrangement as claimed in claim 1, wherein the wavelength of the transmission is given by the formula $$0.01\ h \leq \lambda \leq 30\ h;$$

wherein $\lambda$ is the wavelength of the transmission through the overburden and h is the distance from the seabed to the strata under investigation.

19. An arrangement as claimed in claim 15, wherein the transmission frequency is from 0.01 Hz to 1 kHz.

20. An arrangement as claimed in claim 19, wherein the transmission frequency is from 0.1 to 20 Hz.

21. An arrangement as claimed in claim 1, wherein the generated waveform is selected from the group consisting of square, triangular and sinusoidal signals.

22. An arrangement as claimed in claim 1, wherein the electrodes are spaced apart by a distance in the range 100 to 800 m.

23. An arrangement as claimed in claim 22, wherein the distance is in the range 200 to 300 m.

24. An arrangement as claimed in claim 1, wherein a maximum current of the transmission is in the range 100 to 10,000 A.

25. An arrangement as claimed in claim 24, wherein the range is 1000 to 5000 A.

26. A method of generating an EM wavefield using an arrangement as claimed in claim 1, the method comprising: locating the EM signal generator on a marine vessel, towing the electrodes behind the vessel by means of cables, and applying non-coincident time-varying EM signals to different pairs of electrodes.

27. A method of conducting an EM survey which comprises generating an EM wavefield as claimed in claim 26, detecting the EM response using an EM receiver, and analysing the EM response.

28. A method of producing a survey report of subterranean strata which comprises carrying out a method as claimed in claim 27 and using the analysis to produce a survey report.

* * * * *